March 31, 1942.  H. F. HAVENS ET AL  2,278,351
CHANGE SPEED TRANSMISSION AND CONTROL THEREOF
Filed April 4, 1940  5 Sheets-Sheet 1
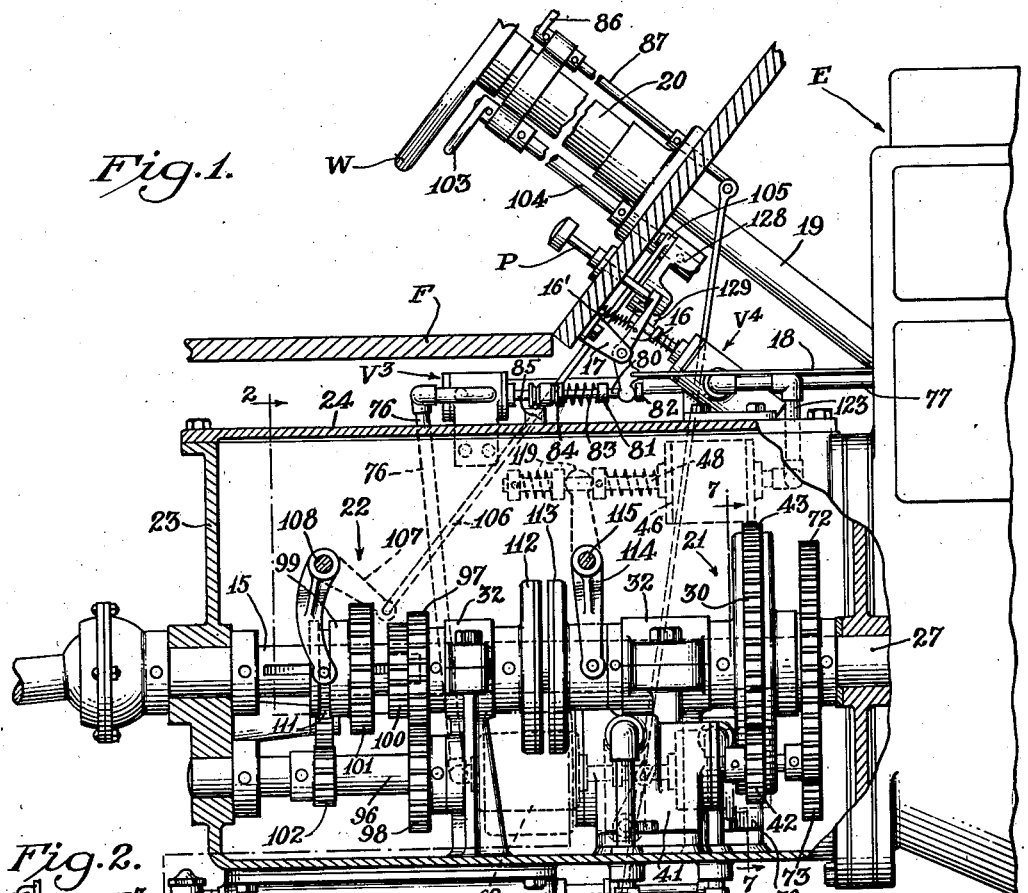
Inventors.
Howard F. Havens
Joseph Wiederhold
BY
Attorneys.

March 31, 1942.   H. F. HAVENS ET AL   2,278,351
CHANGE SPEED TRANSMISSION AND CONTROL THEREOF
Filed April 4, 1940    5 Sheets-Sheet 2
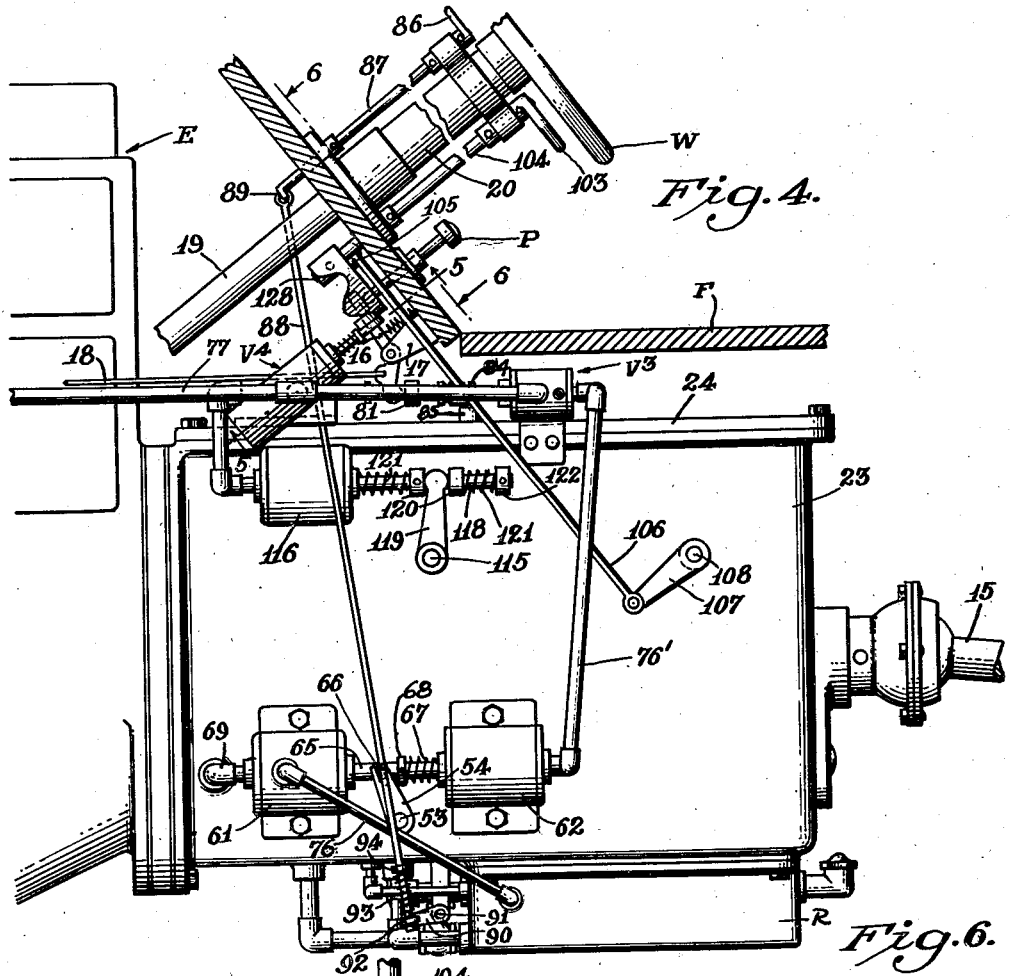
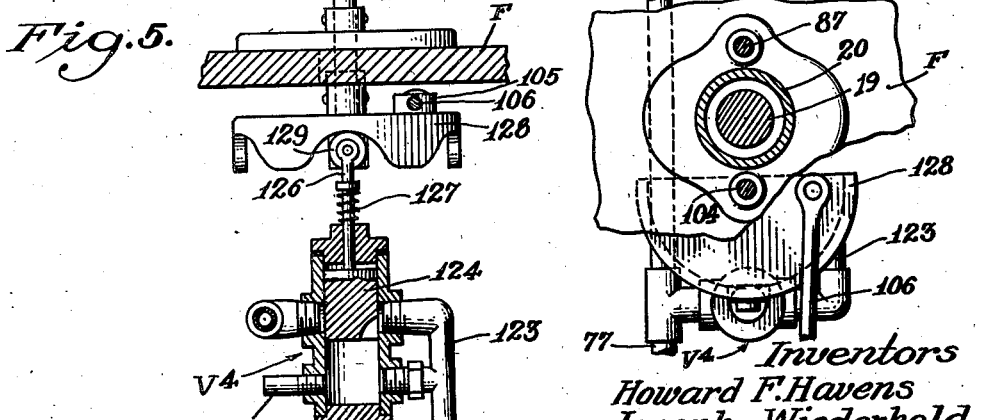
Inventors
Howard F. Havens
Joseph Wiederhold
BY
Attorneys.

March 31, 1942.   H. F. HAVENS ET AL   2,278,351
CHANGE SPEED TRANSMISSION AND CONTROL THEREOF
Filed April 4, 1940   5 Sheets-Sheet 3

Inventors
Howard F. Havens
Joseph Wiederhold
BY
Attorneys.

March 31, 1942.  H. F. HAVENS ET AL  2,278,351
CHANGE SPEED TRANSMISSION AND CONTROL THEREOF
Filed April 4, 1940  5 Sheets-Sheet 5

Inventors
Howard F. Havens
Joseph Wiederhold
BY
Attorneys

Patented Mar. 31, 1942

2,278,351

UNITED STATES PATENT OFFICE 2,278,351

CHANGE-SPEED TRANSMISSION AND CONTROL THEREFOR

Howard F. Havens and Joseph Wiederhold, Dubuque, Iowa

Application April 4, 1940, Serial No. 327,774

21 Claims. (Cl. 74—293)

The invention relates generally to change-speed transmissions for motor vehicles and the like and more particularly to improved means for controlling such transmissions.

One object of the invention is to provide a transmission of the above general character in which the speed ratio is infinitely variable within limits and which embodies novel hydraulic means for effecting such variation.

Another object is to provide novel controls for change-speed transmissions operable automatically to effect the speed changes in accordance with the speed of rotation of the driving shaft.

Another object is to provide a novel control for change-speed transmissions operable to effect a change in the speed ratio at a predetermined point when the driving shaft is accelerating and acting to prevent reverse change in the speed ratio at said predetermined point when the driving shaft is decelerating.

Still another object is to provide a control mechanism of the above character capable of being operated at will to permit immediate change of the speed ratio of the transmission when rapid acceleration is desired.

A further object is to provide a differential change-speed transmission embodying control means normally acting to prevent overrunning of the driven member but operable at will to release the member for free running.

A more specific object is to provide in a motor vehicle a differential change-speed transmission with associated control mechanism normally effective to maintain an operative coupling between the motor and the main drive shaft of the vehicle whereby the motor is enabled to exert a braking effect under certain operating conditions as when the vehicle is proceeding down an incline together with means operable at will to disable the control mechanism and thereby permit the vehicle to run freely of the motor.

Other objects and advantages of the invention will become apparent from the following detailed description of the preferred embodiment illustrated in the accompanying drawings in which:

Figure 1 is a longitudinal vertical sectional view of a change-speed transmission embodying the features of the invention.

Fig. 2 is a transverse sectional view of the transmission taken along the line 2—2 of Fig. 1.

Fig. 3 is a vertical sectional view of the throttle valve taken along the line 3—3 of Fig. 2.

Fig. 4 is a side elevational view of the transmission and associated apparatus.

Fig. 5 is a fragmentary sectional view taken along the line 5—5 of Fig. 4.

Fig. 6 is a view, partly in section, taken along the line 6—6 of Fig. 4.

Figure 7:
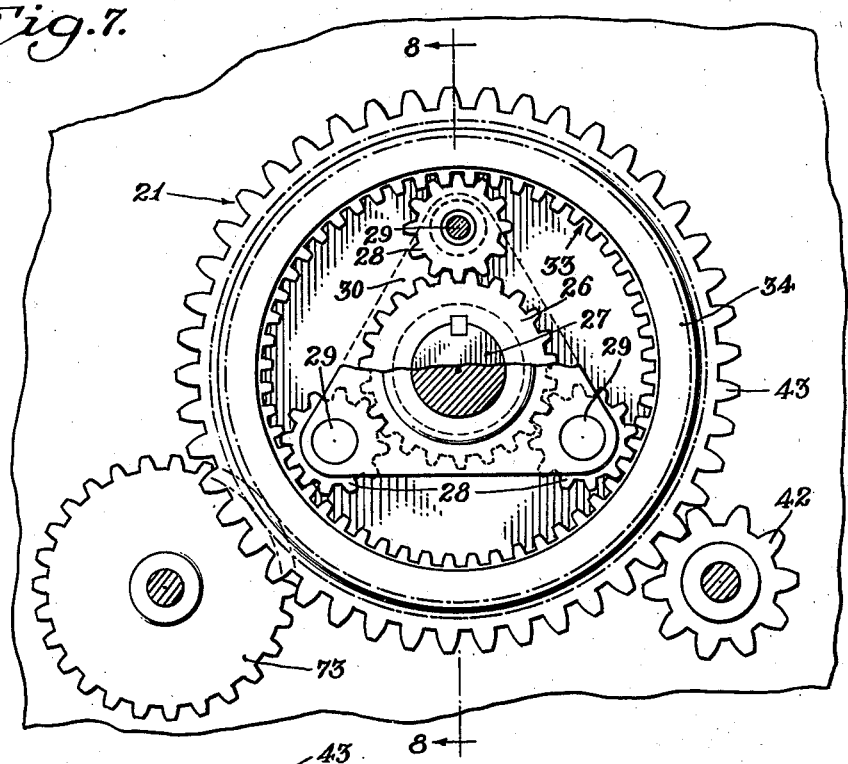
Fig. 7 is a detail view of the planetary gearing taken along the line 7—7 of Fig. 1.
Figure 8:
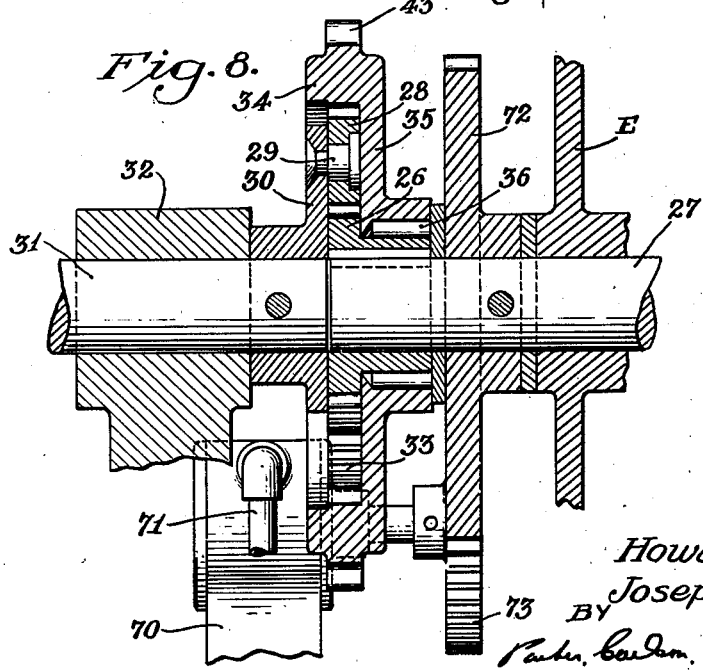
Fig. 8 is a sectional view of the planetary gearing taken along the line 8—8 of Fig. 7.

While we have shown and will herein describe a preferred embodiment of the invention, it is to be understood that the invention is not limited to the particular form shown but is susceptible of various modifications and adaptations as well as changes in the form, construction and arrangement of the parts without departing from the spirit and scope of the invention as defined by the appended claims.

For purposes of illustration, the invention has been shown and will be described as installed in a motor vehicle of the usual and well known type having an internal combustion engine E (Figs. 1, 4 and 9) adapted to be coupled with the driving wheels of the vehicle through a main drive shaft 15. Fuel is supplied to the motor by a carbureter C (Fig. 9) controlled in well known manner by a foot throttle. The latter as herein shown comprises a bell crank lever 16 pivoted intermediate its ends on a bracket 17 secured to the framework of the car below the flooring F. One arm of the lever is connected with the carbureter by a link 18 while the other arm is positioned for engagement by a foot operated plunger P projecting through the flooring F and slidably supported thereon for endwise movement. A spring 16' acting on the lever tends to hold the lever and plunger in upper or idle position shown in Fig. 9 so that depression of the plunger is effective to accelerate the engine.

The vehicle is steered in a well known manner by means of a steering mechanism which forms no part of the present invention. This mechanism includes a wheel W (Fig. 1) carried on the upper end of a rearwardly inclined rod 19. The rod is supported and guided in a hollow column or steering post 20 fixed to the flooring F. The steering post also supports certain control instrumentalities as will appear presently.

Interposed between the engine E and the main shaft 15 is a change-speed transmission mechanism 21 and a reversing mechanism 22 which, with the associated controlling apparatus, constitutes the subject matter of the present invention. As herein shown, the transmission and reversing mechanisms are enclosed in a generally rectangular metal housing 23 bolted or otherwise rigidly secured to the rear end of the engine E. A removable cover plate 24 closes the top of the housing and provides convenient access to the mechanisms enclosed therein. The various control devices for the transmission and reversing mechanism to be described in detail hereinafter are either enclosed in or mounted on the housing 23 to form a compact structure adapted to be installed in or removed from the vehicle as a unit.

Preferably the transmission 21 is of the differential type comprising generally a driving member, a driven member and a reaction member together with suitable means for applying a braking force to the reaction member to vary the relative speeds of rotation of the driving and driven members. In the particular form shown in Figs. 1, 7, 8 and 9, the transmission mechanism comprises a planetary gear train of which the driving member is a sun gear 26 keyed to the crank shaft 27 of the engine E. Meshing with the sun gear are a plurality of planetary gears 28, three in this instance, rotatively mounted on studs 29 carried on a spider 30 which constitutes the driven member of the transmission. The spider 30 is fast on an intermediate shaft 31 axially alined with the crank shaft 27 and journaled in suitable bearings 32 rigid with the housing 23. The planet gears 28 also mesh with a ring gear 33 herein shown as an internal gear formed by teeth cut in the inner face of a peripheral flange 34 integral with a disk 35 rotatably supported on the hub of the sun gear 26 by roller bearings 36.

The operation of planetary gearing of the above type is so well known that no detailed explanation is believed to be necessary. In general, the intermediate shaft 31 and spider 30 which are coupled to the driving wheels of the vehicle will remain stationary as long as the ring gear 33 is free to rotate. If the gear 33 is slowed down or stopped as by application of a braking force the torque of the crank shaft is transmitted through the planet gears to rotate the spider 30 and intermediate shaft 31. The speed or rotation of the latter shaft or, in other words, the speed ratio of the transmission therefore depends upon the braking force applied to the ring gear.

For controlling rotation of the ring gear 33 to vary the speed ratio of the transmission, we provide hydraulic means of novel and advantageous character. This means, as herein shown, comprises a pressure fluid pump 41 (Figs. 2 and 9) of the positive type such as a rotary gear pump or the like. The rotating member of the pump is drivingly connected with the reaction member of the transmission through the medium of a pinion 42 meshing with teeth 43 cut in the periphery of the flange 34 of the ring gear.

Figure 9:
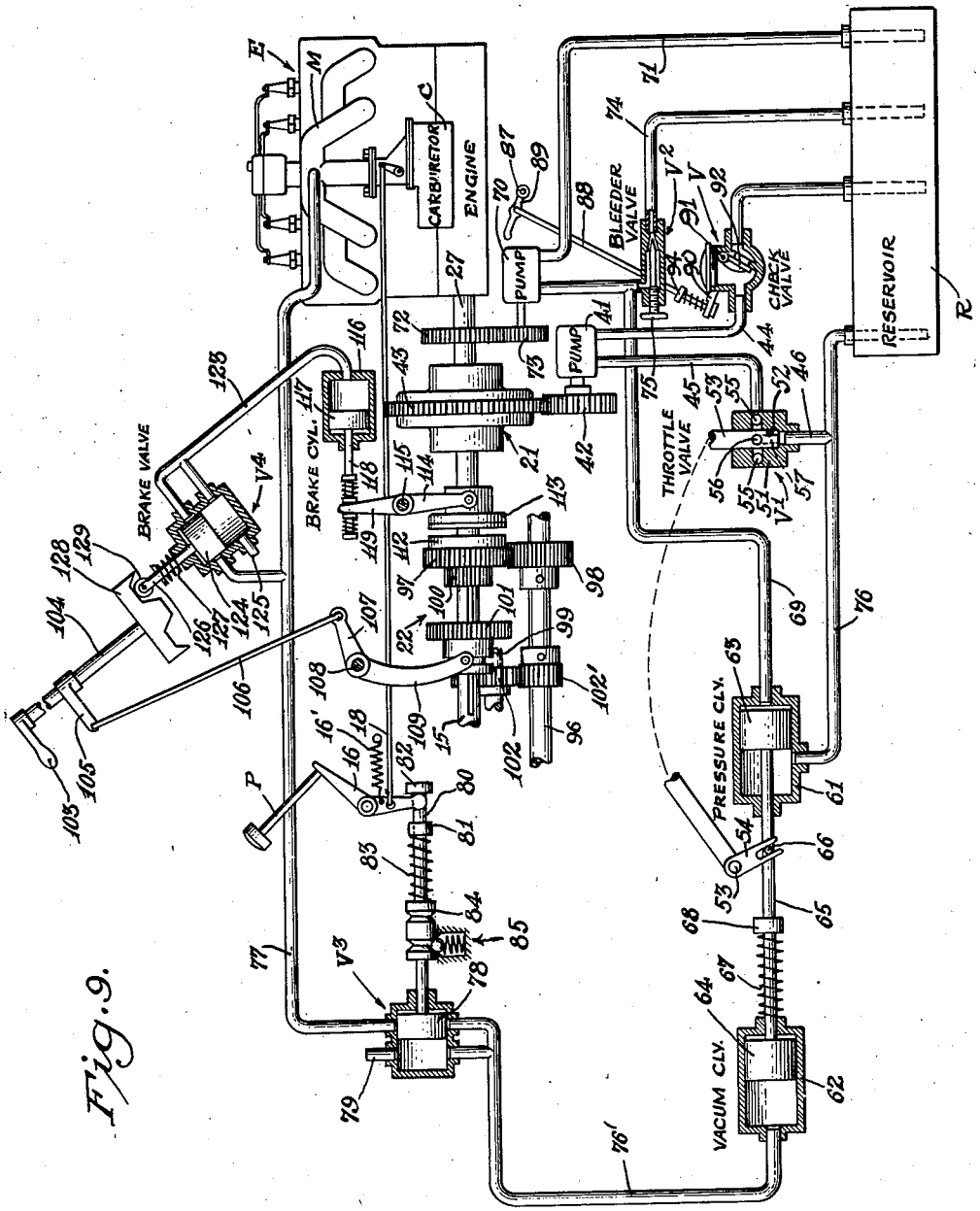
Fig. 9 is a diagrammatic view of the transmission and auxiliary equipment including the manual and automatic controls required in the operation of a motor vehicle and showing the relationship of the various elements of the transmission, controls and vehicle.

As will be seen most clearly in Fig. 9, the pump 41 is arranged to draw fluid such as oil from a tank or reservoir R through a pipe 44 in which is interposed a check valve V normally operative to prevent reverse operation of the pump. The reservoir comprises, in this instance, a generally rectangular metal pan and is conveniently secured to the underside of the housing 23. The fluid is discharged from the pump through a pipe 45 leading to the inlet port of a throttle valve VI. A pipe 46 leads from the outlet port of the valve to the reservoir.

As stated above the pump 41 is of the positive acting type so that the power required for its operation is determined by the extent to which the discharge of fluid therefrom is restricted. Such restriction is controlled by variably setting the throttle valve VI. When the valve is open flow is unrestricted and a minimum of power is required to operate the pump. Under these conditions, the ring gear turns freely so that no torque is transmitted to the main shaft 15. When the throttle valve is closed no flow can take place and the pressure of the fluid accordingly increases until the pump stalls and therefore holds the ring gear stationary. The entire torque of the engine crank shaft is therefore transmitted through the intermediate shaft to the main shaft 15. The restriction of fluid flow may be progressively increased or decreased at will within these limits by setting the valve in intermediate positions, thus providing for infinite variation in the relative speeds of the driving and driven members of the transmission.

While the valve VI may be of any suitable construction, it is preferred to employ a rotary valve for convenience of operation. The particular valve illustrated comprises a generally rectangular casing 51 (Figs. 2, 3 and 9) having a cylindrical valve chamber 52 formed therein. Rotatably mounted in the valve chamber is a valve member 53 having one end extending substantially beyond the casing and through the housing 23 as shown in Fig. 2 and carrying a crank arm 54 by which the member may be rocked about its axis. A branched duct 55 extends from the inlet port to opposite sides of the valve chamber to equalize the pressure on the valve member and thus prevent binding of the member.

Formed in the portion of the member 53 within the valve chamber is a transverse passage 56 communicating with an axial bore 57 opening into the outlet port of the valve. The position of the passage 56 is such that it registers with both ports of the duct 55 when the valve member is rocked to open position. Since the bore 57 communicates with the passage, fluid is permitted to flow through the valve and return to the reservoir through the pipe 46. As the valve member is rocked away from open position, the area of the fluid passage is gradually reduced, thus restricting the discharge of fluid from the pump and correspondingly increasing the power required to operate the same.

The invention provides novel control mechanism for automatically varying the speed ratio of the transmission as required for most efficient operation of a motor vehicle under a wide variety of conditions. In the illustrative embodiment such variations are effected through the operation of the throttle valve VI and the control mechanism is therefore arranged for operating the valve. It will be appreciated, however, that the mechanism can, with slight modifications, be used to advantage in controlling other types of transmissions.

The control mechanism in its preferred form comprises two cooperating power actuated means, one operative when the engine is accelerating to change the speed ratio of the transmission when the engine crank shaft attains or exceeds a predetermined speed rate and tending to effect a reverse change when the engine is decelerating. The other power actuated means is arranged to take over control of the transmission when the engine is decelerating and to prevent the reverse change in the speed ratio until such time as the change is necessitated as by a demand upon the engine for rapid acceleration of the vehicle. This is highly advantageous in avoiding a shift to a lower ratio when the vehicle is slowed down to a cruising speed somewhat slower than the normal running speed. At the same time the shift to a lower ratio is effected quickly and automatically as an incident to the acceleration of the engine.

Referring more particularly to Figs. 4 and 9 of the drawings, the improved transmission control mechanism comprises a pair of cylinders 61 and 62 arranged end to end in axial alinement and bolted or otherwise rigidly secured to the side wall of the transmission housing 23. The cylinders are fitted with pistons 63 and 64, respectively, connected for movement as a unit by a rigid piston rod 65. Movements of the piston assembly are transmitted to the valve member 53 of the throttle valve through the medium of the crank arm 54 which has its free end bifurcated and positioned to straddle a pin 66 projecting radially from the rod 65. A spring 67 interposed between a collar 68 on the rod 65 and the inner end of the cylinder 62 urges the rod toward valve opening position (to the right as viewed in Fig. 9).

The piston assembly is shifted toward valve closing position by introduction of pressure fluid through a pipe 69 into the outer end of the cylinder 61. As herein shown pressure fluid for this purpose is supplied by a suitable pump 70 arranged to draw fluid from the reservoir R through an intake pipe 71 and to discharge it under pressure into the pipe 69. The pump 70 in the present instance is driven from the crank shaft of the engine by a gear 72 fast on that shaft meshing with a pinion 73 fast on the pump shaft. By reason of this direct drive the volume of fluid delivered by the pump is accurately proportioned to the speed of rotation of the engine crank shaft.

In the initial starting of a vehicle, it is desirable to defer transmission of torque to the driving wheels until the motor speed is sufficient to prevent stalling. Means is accordingly provided for preventing the hydraulic mechanism from becoming effective until the volume of the pressure fluid delivered by the pump 70 exceeds a predetermined amount. This is accomplished by bypassing a portion of the fluid through a bleeder valve V2 and a drain pipe 74 which returns the fluid to the reservoir R. The valve V2 is preferably adjustable, a hand wheel 75 being shown for this purpose, so that the speed at which transmission control mechanism becomes operative can be regulated as required.

When the vehicle is stationary and the engine is running idle, the pressure fluid delivered by the pump 70 is discharged through the valve V2. In order to start the vehicle the engine is accelerated by depression of the plunger P and the volume of fluid delivered by the pump increases proportionately until it is no longer possible for all of the fluid to pass through the valve V2. Pressure is therefore built up in the pipe 69 and cylinder 61 until it is sufficient to overcome the force of the spring 67 and shift the piston 63 toward valve closing position. This shift is effected gradually until the piston is at the extreme inner end of the cylinder at which point the throttle V1 is completely closed. The pump 41 accordingly stalls to prevent rotation of the internal gear of the transmission so that the full torque of the motor is transmitted to the main shaft of the vehicle. When the piston 63 is held at the inner end of its cylinder, the pressure fluid supplied to the cylinder 61 is returned to the reservoir through a drain pipe 76 which connects with the cylinder at an intermediate point as shown in Fig. 9.

In the event that it is desired to decrease the speed of the vehicle without changing the speed ratio of the transmission, the plunger P is released and in well known manner decreases the supply of fuel to the engine, thereby slowing down the same. The pump 70 likewise slows down and delivers a smaller volume of pressure fluid which ordinarily would tend to permit reverse movement of the piston 63 toward valve opening position. This movement is prevented, however, by the second power actuated means which, as herein shown, is operated by vacuum derived from the intake manifold M of the engine in a well known manner. To this end, a pipe 76′ is extended from the outer end of the cylinder 62 to a suitable valve V3 having a plunger 78 shiftable between two positions to connect the pipe 76 either with a vacuum line 77 from the manifold M or with a vent 79 open to the air. When the valve plunger is at the left or outer end of the valve casing, the vacuum produced in the manifold acts on the piston 64 to hold it in its advanced position and thus maintain the throttle valve closed independently of the volume of fluid delivered by the pump 70. The arrangement is such, however, that the vacuum operated means is incapable of moving the piston 64 against the action of the spring 67 without the assistance of the hydraulically operated piston 63.

While the valve V3 may be operated in any desired manner, it is preferred to place it under control of the foot operated engine control plunger P so that the valve is automatically set as an incident to the regulation of the engine speed. For this purpose the plunger 78 of the valve is provided with a rod 80 projecting forwardly toward and operatively connected with the lower arm of the bell crank lever 16 by a lost motion connection which is yieldable in one direction. The connection is provided, in the present instance, by a pair of collars 81 and 82 mounted on the rod on opposite sides of the lever. The collar 81 is slidably mounted on the rod and urged toward the lever by a spring 83 interposed between the collar and a sleeve 84 fast on the rod. The collar 82, on the other hand, is fast on the rod. A spring pressed detent 85 coacting with spaced grooves in the sleeve 84 releasably retains the valve plunger in either its advanced or withdrawn position.

With the arrangement above described, the valve plunger is shifted to the position shown in the drawing by engagement of the lever 16 with the collar 82 when the engine is slowed down by release of the plunger P. Cylinder 62 will thus be connected to the vent so that the piston 64 is released for return movement and the throttle valve V1 is opened. The vehicle may then be stopped in the usual way by application of the brakes.

When it is desired to proceed at relatively slow speed with the transmission set at the high speed ratio as for normal full speed operation, the plunger P is only partially released and, due to the lost motion connection between the lever 16 and rod 80, the detent 85 is enabled to hold the valve plunger in its operated position although the engine speed is decreased substantially. Under these conditions, the vacuum acting in the cylinder 62 holds the piston 64 at the outer end of the cylinder so that the throttle valve remains closed and the speed ratio of the transmission is unchanged. If the engine is accelerated gradually no change is necessary in the speed ratio of the transmission since the engine ordinarily produces sufficient torque to accelerate the vehicle under these conditions.

If it is desired to accelerate the vehicle quickly, the plunger P is first fully released to return the plunger 78 to the inner end of the valve casing, thus disconnecting the pipe 76' from the vacuum line 77 and venting it to the air through the vent 79. As the operation of the valve occurs immediately upon release of the plunger and before the engine is decelerated substantially, the spring 67 is enabled to return the piston assembly toward valve opening position, thus decreasing the speed ratio of the transmission. The plunger P may be depressed immediately to speed up the engine and, as the engine speed increases, the shift to a high speed ratio takes place in the manner previously explained. In this way the transmission is adjusted automatically to provide the proper speed ratio for one type of driving condition frequently encountered in the operation of a motor vehicle.

Reference has been made heretofore to a check valve V in the intake line of the pump 41 and its function of preventing reverse operation of the pump. This is particularly advantageous in the case of a transmission such as that disclosed for the reason that in such transmissions the reaction member will be driven reversely in the event that the main drive shaft overruns the crank shaft of the engine as when the vehicle is proceeding down an incline. The check valve V prevents such reverse operation by locking the external gear 43 against rotation, thus maintaining a positive coupling between the engine and the driving wheels of the vehicle. Accordingly, the engine is enabled to exert a braking effect when the vehicle attempts to move at a speed greater than that determined by the speed of rotation of the crank shaft.

It may at times be desirable to permit free running of the vehicle independently of the engine or under what is commonly known as "freewheeling." To obtain such operation, suitable means is provided for opening the check valve when desired. This means, as herein shown, comprises a hand lever 86 (Figs. 1, 4 and 9) carried on one end of an operating rod 87 rotatably supported on the steering post 20 for convenient access by the driver of the vehicle. A link 88 connects a crank arm 89 on the inner end of the rod 87 and an arm 90 fast on a pivot pin 91 which carries the movable member 92 of the check valve. Preferably, the connection between the link 88 and the arm 90 is yieldable so that the valve member may open and close independently of the hand lever. As herein shown the connection is provided by a nut 92a on the lower end of the rod and a spring 93 bearing against a collar 94 fast on the link. With this arrangement the valve may open to admit pressure fluid to the pump without moving the hand lever 86. When it is desired to hold the valve open for "freewheeling" the lever 86 is rocked to operated position.

As it is frequently necessary to reverse the direction of movement or "back up" a motor vehicle, means is provided for reversing the driving connection between the intermediate shaft 27 and the drive shaft 15 of the vehicle. For this purpose a countershaft 96 is supported below and generally parallel to the main shaft 15, the countershaft being journaled in suitable bearings formed in the casing 23. A gear 97 fast on the intermediate shaft meshes with a gear 98 fast on the countershaft thus driving the latter continuously when the intermediate shaft is rotating.

For effecting a driving connection either directly with the intermediate shaft or through the countershaft, we provide a shiftable member in the form of a sleeve 99 splined or otherwise non-rotatably mounted on the main shaft 15 for movement longitudinally thereof. The inner face of the shiftable member 99 is recessed to form one element of a positive clutch, the other element of which comprises a toothed member 100 preferably integral with the gear 97 on the intermediate shaft. Thus, when the member is shifted to the right as viewed in Fig. 1, the clutch members are engaged to provide a direct driving connection between the intermediate shaft and the main shaft so that the vehicle is given a forward motion. The shiftable member 99 is also formed with external gear teeth 101 adapted, when the member is shifted to its alternate position, to mesh with an idler gear 102 which, in turn meshes with a pinion 102' fast on the countershaft 96 and thus effect a reverse driving connection between the intermediate shaft and the main shaft. The member 99 may, of course, be set in an intermediate or "neutral" position whenever desired.

Shifting of the clutch member 99 is effected in the present instance by means of a hand lever 103 carried on the upper end of a rod 104 rotatably supported on the steering post 20 of the vehicle. Fast on the lower end of the rod is an arm 105 connected by a link 106 with a crank arm 107 fast on one end of a rock shaft 108 journaled in the housing 23 and extending transversely thereof above the main shaft 15. Pinned to the shaft 108 is a clutch shifting member 109 having a pair of arms straddling the member 99. An operative connection between the shifting member and the clutch member is provided by pins 110 operating in a peripheral slot 111 in the clutch member. Thus, when the shaft is rocked in one direction by manipulation of the hand lever 103, the clutch members are engaged to complete the direct driving connection between the two shafts. When the rock shaft 108 is rocked in the opposite direction, the clutch member is moved to neutral position. Upon further movement in this direction, the gears 101 and 102 are engaged to reverse the driving connection.

In order to avoid clashing of the gears or clutch elements in the shifting operations above described, means is provided for interrupting rotation of the intermediate shaft prior to engagement of either the clutch elements or the gears. As such shifting should be attempted only when the engine is idling, relatively little force is required to stop the shaft since the reaction member of the transmission is normally free to rotate under these conditions. The means for stopping the shaft may therefore take the form of a friction brake having one member 112 pinned or otherwise rigidly secured to the intermediate shaft and a cooperating member 113 mounted coaxially of the shaft for movement toward and from the first member. The member 113 may be held against rotation in any suitable manner and is adapted to be shifted in the present instance by a two-armed lever 114 carried on a rock shaft 115. The arms of the lever straddle the hub of the member 113 and are operatively secured thereto by suitable pins.

In order to reduce the work of the operator in setting the brake, power operated means is provided for rocking the shaft 115. This means, as herein shown, comprises a cylinder 116 fitted with a piston 117 (Fig. 9) having a rearwardly projecting rod 118 yieldably connected with a crank arm 119 fast on the shaft 115. The connection is provided in the present instance by a pair of collars 120 positioned on opposite sides of the crank arm and yieldably urged into engagement therewith by springs 121, one of which is interposed between a collar and the end of the cylinder 116, the other being interposed between the other collar and a collar 122 fast on the piston rod.

The cylinder and piston mechanism as herein shown is vacuum operated under control of a suitable valve V4. A pipe 123 extends from the cylinder to the valve which has a plunger 124 operative in one position to connect the pipe with the vacuum line 77 and in its alternate position to connect the pipe with a vent 125 open to the air. The valve plunger is normally held in the position shown in Fig. 9 by a spring 127 acting on a rod 126 secured to the plunger and projecting from one end of the cylinder.

Preferably, means is provided for shifting the valve plunger to its alternate position as an incident to the operation of the clutch shifting hand lever 103. For this purpose, a suitable cam 128 is rigidly secured to the lower end of the rod 104 for rotation therewith. The cam is arranged to coact with a follower roller 129 on the projecting outer end of the valve rod 126. The shape of the cam is such that in the initial movement of the hand lever from neutral position to either forward or reverse positions, the valve is set to connect the cylinder 116 with the vacuum line so that the brake is applied to bring the intermediate shaft to rest before the shiftable clutch member is moved sufficiently to engage either the member 100 or the gear 102. Preferably, this cam is formed so that the valve plunger may return to its normal position as soon as the clutch member is set in either forward, reverse or neutral position, thus venting the cylinder 116 to the air and releasing the brake. This mechanism insures quiet operation in shifting gears and effectually prevents damage to the gears in this operation.

Figures 11, 12:
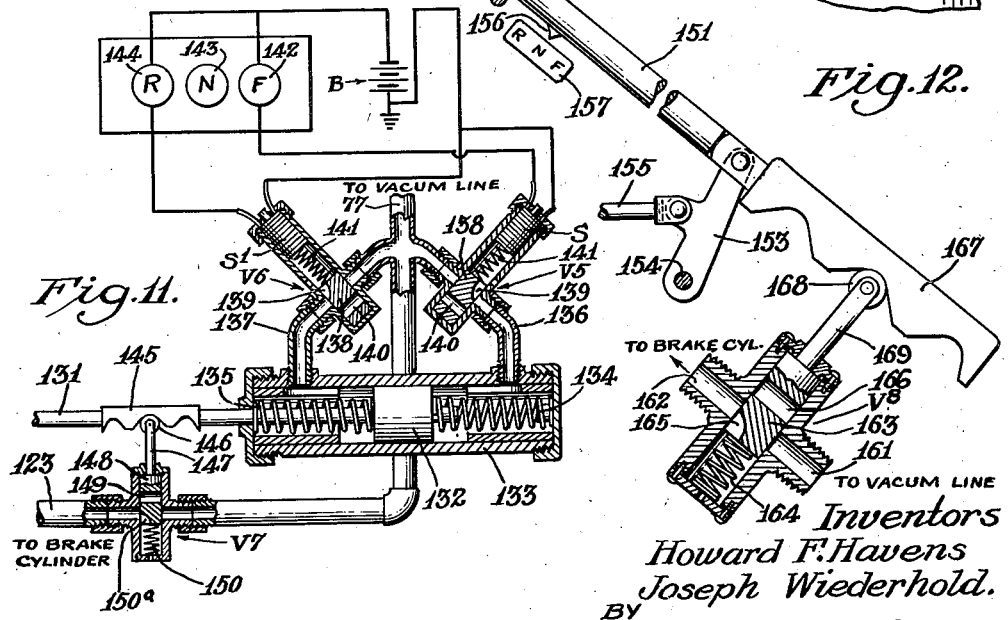
Figs. 11 and 12 are fragmentary views of modified forms of reversing mechanisms.

Referring now to Fig. 11, there is shown a modified form of the gear shifting mechanism wherein the operations are controlled by means of conventional push button actuated switches. The mechanism as herein shown includes an endwise movable shifter rod 131 suitably connected with the arm 107 for rocking the shaft 108 to shift the clutch member 99 to either forward, neutral or reverse position. Movements are imparted to the rod by means of a double acting piston 132 operating in a cylinder 133. The piston is normally held in a central position in the cylinder by coiled compression springs 134 and 135 acting on opposite ends thereof. With the piston thus located, the clutch member is set in the neutral position.

For shifting the piston out of neutral position the outer ends of the cylinder 133 are adapted to be selectively connected with the vacuum line 77 through the medium of inlet pipes 136 and 137 in which are interposed solenoid valves V5 and V6, respectively. Each valve V5 or V6 has a plunger 138 provided with two passages 139 and 140 adapted to be moved into and out of register with the inlet pipe. The plungers are normally held in the position shown in the drawing by springs 141 whereby the ends of the cylinder 133 are vented to the air. Valve V5 is equipped with a solenoid S operative when energized to shift the valve plunger to its alternate position and thus connect the right end of the cylinder 133 with the vacuum line 77. Valve V6 is equipped with a similar solenoid S1 operative when energized, to shift the valve plunger to its alternate position and connect the left end of the cylinder with the vacuum line.

While any suitable means may be utilized for opening and closing the energizing circuits for the solenoids, it is preferred to employ push button switches for this purpose as above stated. In the particular embodiment illustrated, three push buttons are provided as indicated by the circles designated 142, 143 and 144. These are preferably of the well known locking type which when depressed, remain in that position until another button is depressed and thereupon return to normal position. In the present instance, only the push buttons 142 and 144 are equipped with switches, the button 143 acting solely to release either of the other buttons from locked position.

With the circuit arrangement shown in Fig. 11, depression of the "forward" push button 142 connects the car battery B across the terminals of the solenoid V5 to energize the same and thus cause the piston 132 to move to the right and thereby engage the clutch for forward motion of the vehicle. To set the gears for reverse drive, the battery is connected across the terminals of the solenoid S1 by depression of the push button switch 144. For setting the clutch member in neutral position, the neutral, push button 143 is depressed to release either of the other push buttons from operated position and thus open the circuits of both solenoids. Under these conditions both ends of the cylinder 133 are vented so that the pressure on both ends of the piston is equalized and the springs 134 and 135 act to shift the piston to its neutral position.

For applying the brake during this shifting operation, the shifter rod 131 carries the cam 145 which coacts with a follower roller 146 on a rod 147 rigid with the plunger 148 of a control valve V7. This valve performs the same function as the valve V4 previously described, that is, it controls the connection of the brake applying cylinder 116 to the vacuum line 77. For this purpose the plunger 148 is provided with a passage 149 operative when the plunger is shifted downwardly to connect the pipe 123 leading from the end of the cylinder 116 with the vacuum line 77. A spring 150 normally holds the plunger in its upper position in which the cylinder 116 is vented to the air through a port 150a, thereby permitting release of the brake. As will be seen by reference to Fig. 11, the form of the cam 145 is such that the brake is applied in the initial movement of the clutch member 99 toward either forward or reverse drive position and then released as the member reaches that position.

A still further modification of the gear shifting mechanism is shown in Fig. 12. This mechanism includes an endwise shiftable rod 151 having a hand operator or knob 152 at its upper end. The rod is operatively connected with a lever 153 pivoted as at 154 on the transmission housing. A link 155 extends from the lever to the arm 107 on the clutch shifting rock shaft 108. Thus, when the rod 151 is shifted to its lower limit position, the clutch member 99 is shifted forwardly to clutch-engaging or forward drive position. Upon movement of the rod in the opposite direction the clutch member is shifted rearwardly to neutral. Further movement of the rod to the upper limit position shifts the clutch member to reverse position. For convenience of the driver, the different positions may be indicated by a pointer 156 movable with the rod 151 and cooperating with a fixed plate 157 appropriately labeled as with the letters R, N and F for "reverse," "neutral" and "forward," respectively.

Movements of the rod 151 are also utilized to actuate a valve V8 which operates in the same manner and performs the same function as the valve V7 in controlling the venting of the brake cylinder 116 or the connection of this cylinder to the vacuum line 77. The valve V8, as herein shown, has one port 161 adapted to be connected to the vacuum line and a second port 162 adapted for connection with the pipe 123 leading to the cylinder 116. A plunger 163 normally held in the upper or closed position shown by a spring 164, vents the brake cylinder to the air through a by-pass 165. In its alternate position a passage 166, extending through the plunger, registers with the ports 161 and 162, thereby connecting the brake cylinder with the vacuum line.

Movement of the valve plunger between its two positions is effected by a cam 167 fast on the shifter rod 151 arranged to cooperate with a follower roller 168 carried by an extension 169 of the valve plunger. Like the cams 128 and 145 previously described, the cam 169 is formed so as to shift the valve plunger to brake applying position in the initial movement of the clutch member toward either of its active positions. The brake cylinder is vented to the air and the brake released as soon as the clutch member is located in neutral position or fully engaged for either forward or reverse drive.

Figure 10:
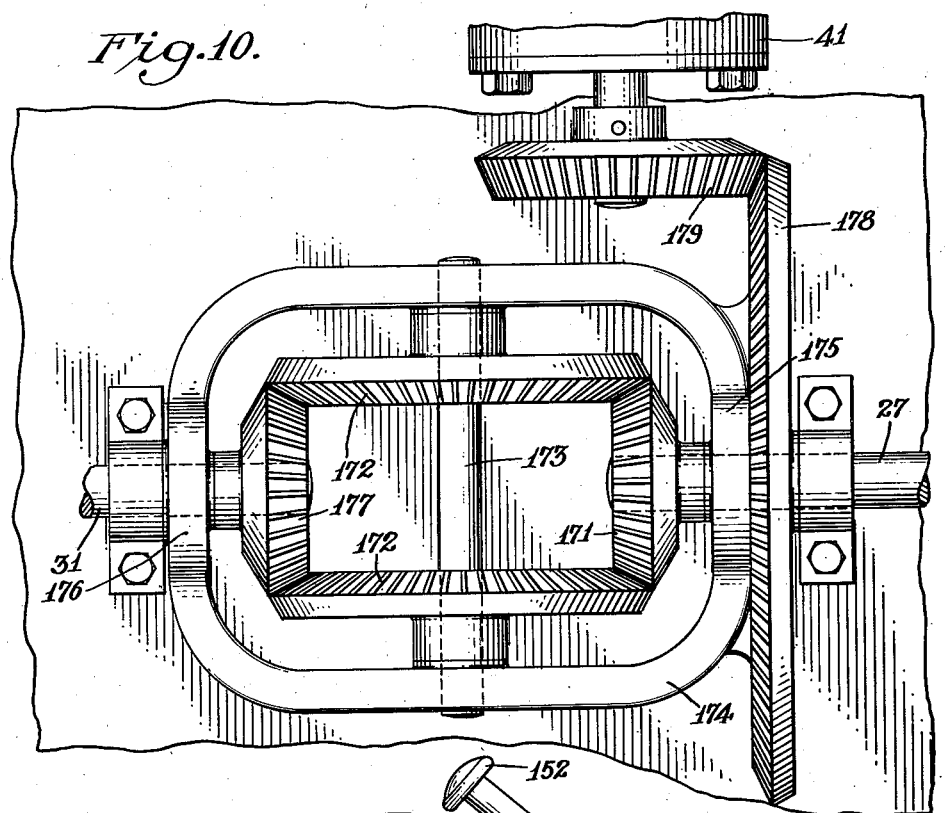
Fig. 10 is a view of a modified form of gearing suitable for use in the transmission.

The Fig. 10 shows another form of differential gear mechanism suitable for speed change transmissions of the type herein disclosed. In this instance the driving member of the differential comprises a beveled gear 171 keyed to the engine crank shaft 27. The gear 171 meshes with a pair of bevel gears 172 loosely mounted on a cross shaft 173 carried on a generally rectangular metal frame 174. The frame constitutes the reaction member of the differential and is formed at opposite ends with bearings 175 and 176 which support the frame for rotation about the common axis of the crank shaft 27 and the intermediate shaft 31. The gears 172 also mesh with a beveled gear 177 keyed to the intermediate shaft 31 and constituting the driven member of the differential.

Formed integrally with the frame 174 is a beveled gear 178 which meshes with a pinion 179 fast on the shaft of the pressure fluid pump 41. The hydraulic circuit for this pump, as explained previously, is controlled by the throttle valve V1 which is arranged to restrict or interrupt the discharge of pressure fluid from the pump and thus regulate the rotation of the reaction member. When the throttle valve is open the gear 178 and frame 174 rotate freely and no torque is transmitted to the intermediate shaft 31. If the frame or reaction member is blocked against rotation as by the closing of the throttle valve, torque is transmitted through the gears 171, 172 and 177 to the intermediate shaft. It will be understood, of course, that the speed of rotation of the intermediate shaft relative to that of the crank shaft can be varied as required within the limits set by the gear ratios by variably restricting the rotation of the reaction member.

It will be apparent from the foregoing that the invention provides a change speed transmission of novel and advantageous character particularly suitable for motor vehicles or the like. The transmission includes a differentially operable mechanism together with improved controls for automatically varying the speed ratio of the transmission to provide for efficient operation of the vehicle under a wide variety of conditions. More particularly the controls effect a change in the speed ratio of the transmission when the engine of the vehicle is accelerated to a predetermined speed sufficient to avoid stalling but reverse change in the speed ratio is prevented when the engine is slowed down below predetermined speed, thus making it possible to cruise at reduced speed with the full torque of the engine transmitted to the wheels of the vehicle.

The invention also provides novel control means particularly suitable for use with differential change speed transmissions whereby the drive shaft is effectually prevented from overrunning the crank shaft. In other words, the drive wheels of the vehicle are maintained operatively coupled with the motor at all times so that the motor is enabled to act as a brake when the vehicle is proceeding down an incline. This control means is operable at will to interrupt the coupling between the motor and the driving wheels of the vehicle so that the vehicle may run freely of the engine.

We claim as our invention:

1. In a change-speed transmission mechanism, in combination, a drive shaft, a driven shaft, an intermediate shaft, a differential comprising a pair of terminal members and an intermediate member and having one terminal member fast on the drive shaft and the other terminal member fast on the intermediate shaft, pressure fluid operated means including a fluid pump geared to the intermediate member for varying the speed of said other terminal member, a counter shaft geared to said intermediate shaft, shiftable means operative in one position to connect said intermediate shaft directly with said driven shaft and operative in a different position to connect the intermediate shaft with the driven shaft through said counter shaft, and means operated as an incident to the movement of said shiftable means toward either of said positions for interrupting the rotation of said intermediate shaft.

2. An automatic change-speed transmission mechanism comprising a pair of axially aligned shafts, sun and planet gearing including a driving member fast on one of said shafts, a driven member fast on the other of said shafts, and a reaction member; a pressure fluid pump drivingly connected with said reaction member, a valve controlling the discharge of fluid from said pump to regulate the movement of said reaction member, pressure fluid operated means for operating said valve, and a pump driven from said one shaft for supplying pressure fluid to said valve operating means.

3. An automatic change-speed transmission mechanism comprising a pair of axially aligned shafts, differential gearing including a driving member fast on one of said shafts, a driven member fast on the other of said shafts, and a reaction member; a pressure fluid pump drivingly connected with said reaction member, a valve controlling the discharge of fluid from said pump to regulate the movement of said reaction member, pressure fluid actuated means for operating said valve, a pressure fluid supply line for said valve actuating means, a pump driven from said one shaft and adapted to discharge into said supply line a volume of pressure fluid proportioned to the speed of rotation of said one shaft, and a branch line connected with said supply line for by-passing a portion of the fluid delivered by said pump to delay actuation of the valve operating means until said one shaft attains a predetermined speed of rotation.

4. An automatic change-speed transmission mechanism comprising a pair of axially aligned shafts; differential gearing including a driving member fast on one of said shafts, a driven member fast on the other of said shafts, and a reaction member, a pressure fluid pump drivingly connected with said reaction member, a valve controlling the discharge of fluid from said pump to regulate the movement of said reaction member, pressure fluid actuated means for operating said valve, a pressure fluid supply line for said valve actuating means, a pump driven from said one shaft and adapted to discharge into said supply line a volume of pressure fluid proportioned to the speed of rotation of said one shaft, a branch line connected with said supply line for by-passing a portion of the fluid delivered by said pump, and an adjustable valve in said branch line for regulating the quantity of fluid by-passed therethrough to determine the speed at which said one shaft is required to rotate to initiate operation of said valve actuating means.

5. The combination with a change-speed transmission for motor vehicles, of control mechanism for the transmission including hydraulically actuated means operative to effect a change in the speed ratio of the transmission when the engine of the vehicle is accelerated to a predetermined minimum speed, vacuum actuated means for preventing a reverse change in the speed ratio of the transmission when the engine is slowed down to a speed less than said predetermined minimum speed, and means for controlling the engine speed and for rendering operable and inoperable said vacuum actuated means.

6. The combination with a change-speed transmission for motor vehicles, of control mechanism for the transmission including hydraulically actuated means operative to effect a change in the speed ratio of the transmission when the engine of the vehicle is accelerated to a predetermined minimum speed, vacuum actuated means for preventing a reverse change in the speed ratio of the transmission when the engine is slowed down to a speed less than said determined minimum speed, and means operable at will to disable said vacuum actuated means.

7. An automatic change-speed transmission mechanism comprising a pair of axially aligned shafts; sun and planet gearing including a driving member fast on one of said shafts, a driven member fast on the other of said shafts, and a reaction member; a pressure fluid pump drivingly connected with said reaction member, a valve controlling the discharge of fluid from said pump to regulate the movement of the reaction member, means for operating said valve in accordance with the speed of said one shaft to vary the movement of said reaction member and thereby progressively change the speed ratio between the driving and the driven shaft, said valve operating means including a cylinder, a piston working in said cylinder and operatively connected with said valve, and a pump driven from said one shaft for supplying pressure fluid to said cylinder.

8. In a power transmission, a power drive shaft, a driven shaft, a planetary gearing between said shafts including a sun gear fast on the drive shaft, a plurality of planet gears carried by a spider fast on the driven shaft, an internal gear, a pressure fluid pump driven by said internal gear, valve means operative to control the discharge of fluid from said pump and thereby vary the force required to turn said internal gear, means for operating said valve means to effect a progressive change in the relative speeds of rotation of said shafts when the drive shaft is accelerating, and means for preventing reverse operation of said valve means when the drive shaft is decelerating.

9. In a power transmission, a power drive shaft, a driven shaft, a planetary gearing between said shafts including a sun gear fast on the drive shaft, a plurality of planet gears carried by a spider fast on the driven shaft, an internal gear, braking means operative to vary the force required to turn the internal gear and thus change the relative speeds of rotation of said shafts, control means operative to actuate said braking means to effect a progressive increase in the speed ratio of the drive shaft and driven shaft when said drive shaft is accelerating, and means acting on said control means to prevent a decrease in the speed ratio of the drive shaft and the driven shaft when the drive shaft is decelerating.

10. The combination with an internal combustion engine, of a driven shaft, a change-speed transmission connecting said shaft to said engine, control means actuated by said engine operable to vary the speed ratio of the transmission when the engine is accelerating, other control means actuated by said engine to prevent a change in the speed ratio when the engine is decelerating, and manually operable means for disabling said other control means during deceleration of the engine to render said first control means effective to adjust the speed ratio of the transmission in accordance with the speed of the engine.

11. The combination with a change speed transmission connecting a power drive shaft and a driven shaft, of a member shiftable in one direction to increase the speed ratio of the transmission and in the other direction to decrease the speed ratio of the transmission, yieldable means tending to shift said member in said other direction, means actuated by the drive shaft operative to shift said member in said one direction when the drive shaft is rotated at a predetermined speed, means acting to hold the member in advanced position against the action of said yieldable means when the speed of rotation of the drive shaft is decreased below said predetermined speed, and means operable at will to disable said holding means and permit said yieldable means to become effective.

12. The combination with a change-speed transmission conecting a power drive shaft and a driven shaft, of a member shiftable in one direction to increase the speed ratio of the transmission and in the other direction to decrease the speed ratio of the transmission, yieldable means tending to shift said member in said other direction, means actuated by the drive shaft operative to shift said member in said one direction when the drive shaft is rotated at a predetermined speed, means acting to hold the member in advanced position against the action of said yieldable means when the speed of rotation of the drive shaft is decreased below said predetermined speed, and means operable at will to disable said holding means, said yieldable means then acting to shift said member to a position determined by the speed of rotation of the drive shaft.

13. The combination with a change-speed transmission mechanism for motor vehicles including differential gearing interposed between the motor and the main drive shaft of the vehicle, of hydraulic means for controlling the speed ratio of the transmission mechanism, said hydraulic means comprising a reversible delivery pump driven from said differential gearing, valve means for regulating the discharge of said pump when operating in a forward direction, other valve means independent of the first-mentioned valve means for preventing reverse operation of the pump, and manually operable means for holding said other valve means open and thereby permitting reverse operation of the pump.

14. The combination with a differentially operating change-speed transmission for a motor vehicle including a driving member connected with the engine of the vehicle, a driven member connected with the drive wheels of the vehicle, and a reaction member; of a pressure fluid pump arranged to be driven by the reaction member, intake and discharge lines for said pump, valve means in the discharge line controlling the delivery of fluid therefrom to restrict or interrupt the rotation of the reaction member and thus initiate rotation of the driven member, a valve in the intake line for preventing reverse operation of the pump by the reaction member to maintain an effective coupling between the engine and the drive wheels of the vehicle, and means operable at will for opening said last mentioned valve to allow the vehicle to run free of the engine.

15. The combination with a differentially operating change-speed transmission for a motor vehicle including, a driving member connected with the engine of the vehicle, a driven member connected with the drive wheels of the vehicle, and a reaction member; of control means operable in forward and reverse directions for regulating the speed of rotation of the reaction member to vary the speed ratio of the transmission, other control means independent of the first-mentioned control means and normally operative to hold the reaction member against reverse rotation and thereby prevent overrunning of the driven member of the transmission, and manually operable means for disabling said other control means when the reaction member is reversely rotating to release the driven member for free running.

16. The combination with a change-speed transmission mechanism for motor vehicles including differential gearing interposed between the motor and main drive shaft of the vehicle, of reversible hydraulic means for controlling the speed ratio of the transmission mechanism, said hydraulic means including a valve for regulating the hydraulic flow through said means and consequently said speed ratio, and another valve independent of said first-mentioned valve automatically operable to permit flow in one direction only, and manually operable means for operating said other valve to permit flow in the other direction.

17. The combination with a change-speed transmission mechanism for motor vehicles including differential gearing interposed between the motor and main drive shaft of the vehicle, of reversible hydraulic means for controlling the speed ratio of the transmission mechanism, said hydraulic means including a valve for regulating the hydraulic flow through said means and consequently said speed ratio, another valve independent of the first-mentioned valve operable when closed to cause said hydraulic means to hold the speed ratio at its maximum when the main drive shaft tends to overrun whereby the motor will act as a brake on said main drive shaft, and manually operable means for holding said other valve open when the main drive shaft tends to overrun whereby the main drive shaft is permitted to run free.

18. The combination with a change-speed transmission mechanism for motor vehicles including differential gearing interposed between the motor and main drive shaft of the vehicle, said gearing being operable with either the motor or the main drive shaft as the driver, of hydraulic means for controlling the speed ratio of the transmission mechanism, said hydraulic means comprising a pump driven by a part of said differential gearing operating in one direction when the motor is the driver and operating in the other direction when the main drive shaft is the driver, a control valve controlling the output of the pump when the motor acts as the driver, a check valve operable to prevent operation of the pump when the main drive shaft acts as the driver whereby the motor acts as a brake on the main drive shaft, and manually operable means to render said check valve inoperable whereby the pump is free to operate when the main drive shaft acts as the driver and the main drive shaft is thereby freed of the motor.

19. The combination with a change-speed transmission for motor vehicles, of control mechanism for the transmission including hydraulically actuated means operative to effect a change in the speed ratio of the transmission when the engine of the vehicle is accelerated to a predetermined speed, vacuum actuated means for preventing a reverse change in said speed ratio when the engine is decelerated to a speed less than said predetermined speed, speed controlling means for the engine, and means connected with said speed controlling means for disabling said vacuum actuated means.

20. The combination with a change-speed transmission for a motor vehicle, of control mechanism for the transmission, means responsive to the speed of the engine of the vehicle to change the speed ratio of the transmission on acceleration of the engine, vacuum actuated means for preventing a reverse change in said speed ratio as the engine is decelerated, speed controlling means for the engine, and means connected with said speed controlling means for disabling said vacuum actuated means.

21. The combination with a change-speed transmission for a motor vehicle, of control mechanism for the transmission, means responsive to the speed of the engine of the vehicle to change the speed ratio of the transmission on acceleration of the engine, vacuum actuated means for preventing a reverse change in said speed ratio as the engine is decelerated, a manually operable control member movable from a given position to cause acceleration of the engine, and means connected with said control member for disabling said vacuum actuated means when said control member approaches said given position.

HOWARD F. HAVENS.
JOSEPH WIEDERHOLD.